(12) United States Patent
Kupper et al.

(10) Patent No.: US 8,764,438 B2
(45) Date of Patent: Jul. 1, 2014

(54) CEMENT SYSTEM AND METHOD FOR OPERATING A CEMENT SYSTEM

(76) Inventors: Detlev Kupper, Telgte (DE); Dietmar Schulz, Beckum (DE)

( * ) Notice: Subject to any disclaimer, the term of this patent is extended or adjusted under 35 U.S.C. 154(b) by 329 days.

(21) Appl. No.: 13/054,947

(22) PCT Filed: Jul. 28, 2009

(86) PCT No.: PCT/EP2009/059758
§ 371 (c)(1),
(2), (4) Date: Jan. 20, 2011

(87) PCT Pub. No.: WO2010/015551
PCT Pub. Date: Feb. 11, 2010

(65) Prior Publication Data
US 2011/0126738 A1    Jun. 2, 2011

(30) Foreign Application Priority Data

Aug. 4, 2008    (DE) .................. 10 2008 036 088

(51) Int. Cl.
| | |
|---|---|
| F27B 15/00 | (2006.01) |
| F27B 14/00 | (2006.01) |
| F27D 7/00 | (2006.01) |
| F27B 9/40 | (2006.01) |
| F27D 19/00 | (2006.01) |
| C04B 7/38 | (2006.01) |
| C04B 2/10 | (2006.01) |
| C04B 7/60 | (2006.01) |
| F23J 11/00 | (2006.01) |
| F23J 15/00 | (2006.01) |
| F23B 70/00 | (2006.01) |
| F23B 80/02 | (2006.01) |
| F23C 9/00 | (2006.01) |
| F23N 5/02 | (2006.01) |

(52) U.S. Cl.
USPC ............. 432/14; 106/768; 106/771; 106/752; 432/58; 432/105; 432/37; 432/13; 432/19; 110/345; 110/190; 110/204

(58) Field of Classification Search
USPC ............ 432/14, 58, 105, 37, 13, 19; 106/768, 106/771, 752; 110/345, 190, 204
See application file for complete search history.

(56) References Cited

U.S. PATENT DOCUMENTS 4,715,811 A * 12/1987 Lawall ............................ 432/58
(Continued)

FOREIGN PATENT DOCUMENTS

| EP | 1428804 A2 | 6/2004 |
| EP | 1923367 A1 * | 5/2008 |

(Continued)

OTHER PUBLICATIONS

Twomey C et al: "The Identity of the Sulfur-Containing Phases Present in Cement Clinker Manufactured Using A High Sulfur Petroleum Coke Fuel" Journal of Chemical Technology and Biotechnology, Blackwell Scientific Publications. Oxford, GB, Bd. 79, Nr. 5, May 1, 2004, Seiten 486-490, XP001236563 ISSN: 0268-2575 Zusammenfassung.
(Continued)

Primary Examiner — Kaj K Olsen
Assistant Examiner — Karam Hijji
(74) Attorney, Agent, or Firm — Renner Kenner Greive Bobak Taylor & Weber

(57) ABSTRACT

In the method according to the invention for operating a cement plant, the raw meal is preheated in a preheating zone, the preheated material is precalcined in a calcining zone and the precalcined material is finally sintered in a sintering zone. The cement plant is operated in such a manner that the precalcined material which is supplied to the sintering zone has an $SO_3$ concentration of at least 5.5% by mass and a $CaSO_4$ proportion of at least 75%, preferably 90%, of the total salt content.

12 Claims, 2 Drawing Sheets

(56) References Cited

U.S. PATENT DOCUMENTS

| | | |
|---|---|---|
| 5,156,676 A | 10/1992 | Garrett |
| 6,050,813 A | 4/2000 | Doumet |
| 6,325,620 B1 | 12/2001 | Heinemann |
| 6,383,283 B1 * | 5/2002 | Doumet .................. 106/743 |
| 2007/0178418 A1 * | 8/2007 | Meyer et al. ................ 432/14 |
| 2008/0092781 A1 * | 4/2008 | Ramirez Tobias et al. ... 106/767 |

FOREIGN PATENT DOCUMENTS

| | | |
|---|---|---|
| WO | 2005003655 A2 | 1/2005 |
| WO | 2006016210 A2 | 2/2006 |

OTHER PUBLICATIONS

Mortensen AH et al: "Umstellung von zwei Ofenlinien auf die 100% Befeuerung mit hochschwefelhaltigem Petrolkoks Massnahmen zur Realisierung eines kostenbesparenden Konzepts, Teil 1 [Converting two kiln lines to 100% high sulphur petroleum coke firing—procedures for implementing a cost-saving scheme, Part 1]" ZKG International, Bauverlag BV., G]Tersloh, DE, Bd. 51, Nr. 2, Jan. 1, 1998, Seiten 84-87,90, XP008115346 ISSN: 0949-0205 das ganze Dokument.

Lene J-C: "High sulfur fuels—Fired for action" World Cement, Palladian Publications, Elstead, GB, Bd. 32, Nr. 12, Dec. 1, 2001, Seiten 28-32, XP008115244 ISSN: 0263-6050 Zusammenfassung.

* cited by examiner

CEMENT SYSTEM AND METHOD FOR OPERATING A CEMENT SYSTEM

TECHNICAL FIELD

The invention relates to a cement plant and a method for operating a cement plant.

BACKGROUND OF THE INVENTION

In cement clinker production, the raw material is first preheated, then precalcined and finally burnt in an oven. The actual combustion process takes place in the sintering zone of the oven, in which the material is heated to temperatures of from 1400° C. to 1500° C.

DE69806182 relates to a method for producing cement clinker by means of sulphur-rich fuel, the oxygen concentration being increased at the inlet of the combustion oven to from 4.5% to 5.5%, whereby the temperature at which the calcium sulphate breaks down is increased to a temperature greater than the sintering temperature so that $CaSO_4$ becomes a component of the end product instead of breaking down into gases and leaving deposits in the combustion oven, the preheating oven and the preheating cyclones.

Specific components, particularly alkali metals in combination with chlorine and sulphur, become volatile in the sintering zone of the oven and are discharged with the oven exhaust gas (volatility). The oven exhaust gas is used to thermally process the material in the calcining zone and the preheating zone. During that heat exchange, the volatile components condense on the raw material (adsorption) and are again introduced into the sintering zone. There, they partially become volatile again so that a circuit of those components is thereby formed. Consequently, everything which is not discharged out of the system with the cement clinker or the exhaust gas remains in that circuit, very high concentrations of the components carried in the circuit being able to be reached. All the circuits may result in undesirable formation of deposits in the calcining zone and the preheating zone and disruptions to operation. The cause is that specific mixtures of the circuit components result in eutectic compositions which melt at comparatively low temperatures. When the raw material melts and becomes crystallised on the plant walls, deposits are formed.

A particular problem in this context is the sulphur which is introduced into the circuit via the raw material and the fuel. The maximum $SO_3$ concentration allowed in the combustion material is therefore currently 5%. At higher concentrations, there is a risk of blockage and the plant can no longer be operated. If chlorine is further present, the tolerable quantity of $SO_3$ is further reduced. In the illustration according to FIG. 1, the interaction of $SO_3$ and Cl is illustrated on deposits in the inlet of the cylindrical rotary kiln. No deposits can be established in the region A whereas normal cleaning is necessary in region B and intensive cleaning is necessary in region C. There is a risk of blockage in the region D and at an $SO_3$ concentration of more than 5%.

Therefore, attempts have previously been made to prevent circuits or volatility. In order to reduce the circuit concentration, it is known to provide a bypass which removes a portion of the oven exhaust gases. As a result, circuit components are removed from the circuit and the charges of the circuits are reduced. The circuit concentrations are thereby reduced and formations of deposits diminished, the availability of the plant thereby being improved.

However, there are fuels which have a relatively high sulphur concentration and could not therefore previously be used in cement production. Although EP-A2-1428804 sets out a cement clinker which is intended to be produced with fuel which has a sulphur concentration of more than 5%, the patent specification does not set out in greater detail how that cement clinker can be produced without resulting in formations of deposits in the preheater or calciner or increased $SO_2$ emissions.

SUMMARY OF THE INVENTION

Therefore, the problem addressed by the invention is to provide a method and a device for operating a cement plant, it being possible to use fuel with a high sulphur content without increasing the $SO_2$ emissions, and further to ensure adequate operational safety.

This problem is solved according to the invention by the features of claims 1 and 12.

In the method according to the invention for operating a cement plant, the raw meal is preheated in a preheating zone, the preheated material is precalcined in a calcining zone and the precalcined material is finally sintered in a sintering zone. The cement plant is operated in such a manner that the precalcined material which is supplied to the sintering zone has an $SO_3$ concentration of at least 5.5% by mass and a $CaSO_4$ proportion of at least 75% by mass, preferably 90%, of the total salt content.

The cement plant according to the invention has a preheating zone for preheating the raw material, a calcining zone for precalcining the preheated material and a sintering zone for sintering the precalcined material. There is further provided a control and regulation device for operating the cement plant according to the above method.

The invention is based on recognition that the deposit formation depends not only on the sulphur concentration but also on the salt composition and in particular the $CaSO_4$ proportion. With a correspondingly high $CaSO_4$ proportion, therefore, the $SO_3$ concentration can be raised significantly above the previously tolerable amount. With a $CaSO_4$ proportion of 90% by mass of the total salt content, the $SO_3$ concentration can be increased to over 10% by mass.

In the tests forming the basis of the invention, it has been found that it is possible to selectively influence, owing to the operation of the plant, the processes of "adsorption" and "volatility" which determined the sulphur concentration in the circuit.

The dependent claims relate to other advantages and constructions of the invention.

According to a preferred construction of the invention, at least some of the following operating parameter measurements are carried out and used to control the cement plant:

a. gas analysis in the inlet region of the sintering zone, calcining zone and/or before the beginning of the preheating zone,
b. temperature measurement of material and/or gas in the sintering zone,
c. temperature measurement of material and/or gas in the calcining zone,
d. temperature measurement of material and/or gas in the preheating zone,
e. laboratory analyses of the precalcined material, the raw material or the fuel,
f. laboratory analyses of the cement clinker burnt in the sintering zone,
g. thermal or thermographic analysis in the region of the sintering zone.

The SO$_3$ concentration and the CaSO$_4$ proportion in the precalcined material can be further influenced by one or more of the following steps:
a. selecting the raw materials,
b. selecting the fuel used in the sintering zone,
c. adjusting the momentum of a burner operated in the sintering zone,
d. adjusting the relationship of the combustion air and fuel in the sintering zone,
e. adjusting the relationship of the fuel amount and raw meal amount at least at one fuel supply location of the plant,
f. adjusting the precalcining degree of the raw meal after the calcining zone,
g. adjusting the raw meal fineness.

The cement plant is further advantageously operated in such a manner that the sulphur volatility in the sintering zone is at least 60%, preferably at least 80% and the sulphur adsorption in the preheater region, in the calcining zone and/or in the sintering zone is at least 80%, preferably at least 90%.

The exhaust gas leaving the preheater is further intended to have an SO$_2$ content of less than 600 mg/Nm$^3$ at 10% of O$_2$, preferably less than 300 mg/Nm$^3$ at 10% of O$_2$. This is achieved by increasing the adsorption in conjunction with the adjusted volatility.

BRIEF DESCRIPTION OF THE DRAWINGS

Other advantages and constructions of the invention will be explained in greater detail below with reference to the description and the drawings, in which.

DETAILED DESCRIPTION OF THE INVENTION

Figure 1:
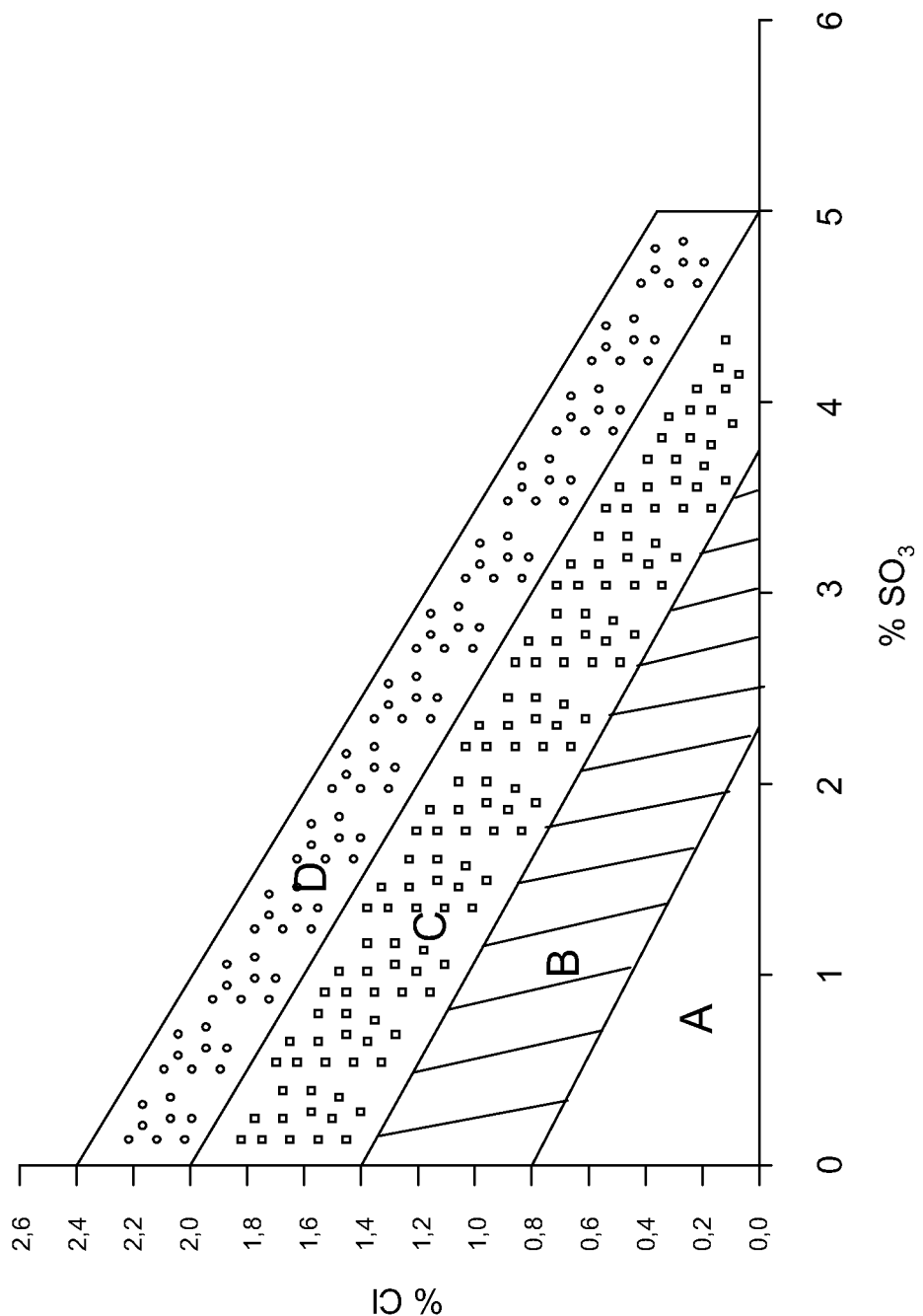
FIG. 1 is an illustration of the interaction of SO$_3$ and Cl on deposits in the inlet of the cylindrical rotary kiln and FIG. 2 is a schematic illustration of a cement plant.
Figure 2:
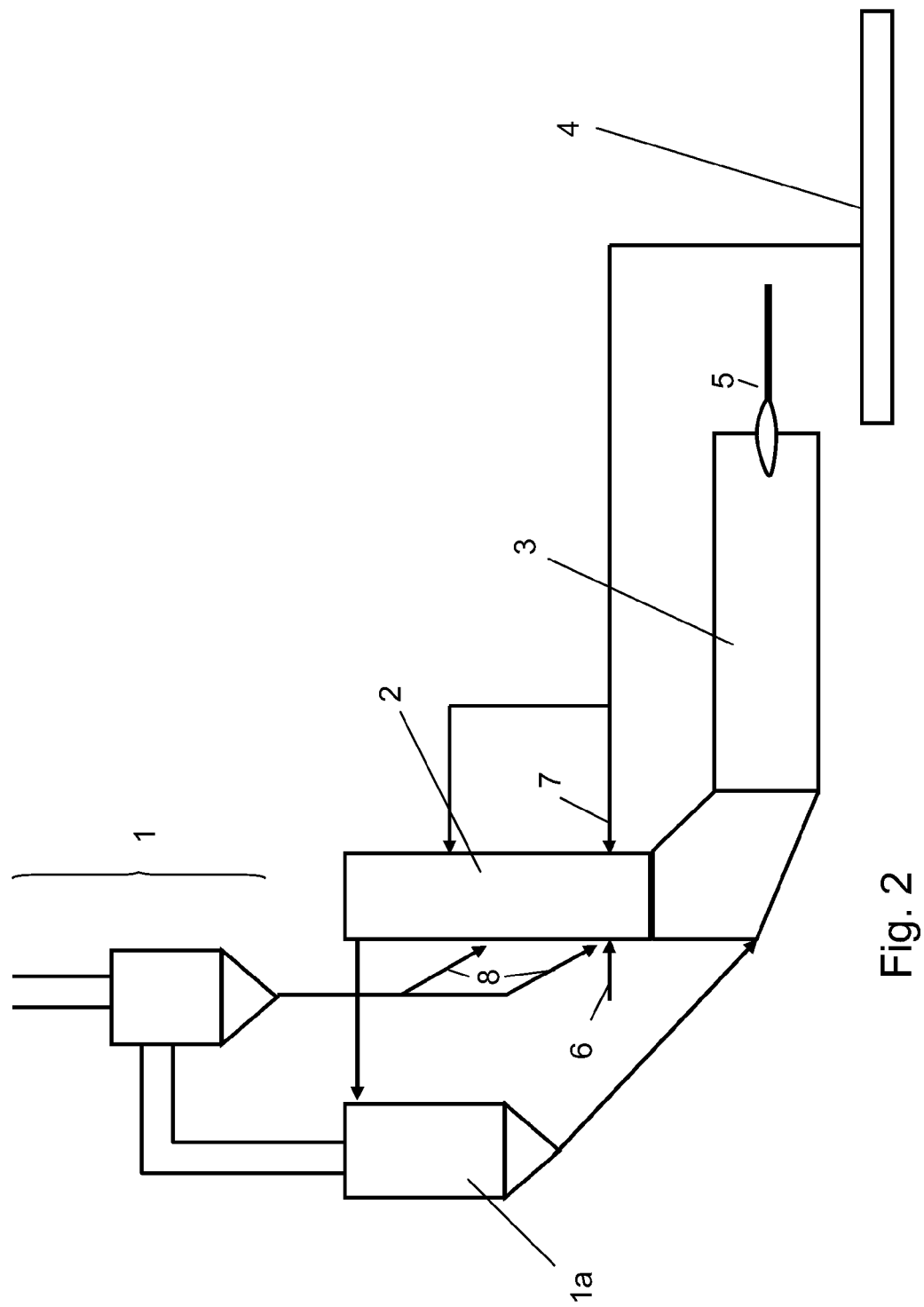

The cement plant according to FIG. 2 substantially comprises a preheating zone 1 which is formed, for example, by a multiple-stage suspension type heat exchanger, a calcining zone 2 and a sintering zone 3 which is in the form of a cylindrical rotary kiln and a downstream cooling zone 4 which is in the form, for example, of a displaceable grate cooler. The exhaust gases of the sintering zone 3 flow successively through the calcining zone 2 and the preheating zone 1, the raw meal is supplied in counter-current to the exhaust gases in a manner which is known per se to the preheating zone 1 and subsequently the calcining zone 2 before the precalcined material is burnt in the sintering zone 3. The sintering zone has at least one burner 5 having adjustable momentum.

The sintering zone 3 is operated with a burner having adjustable momentum so that the shape, size and/or temperature of the flame can be adjusted by adjusting the momentum.

In the embodiment illustrated, the calcining zone 2 is formed by an inclined line which is connected to the bottom cyclone 1a of the preheating zone via an angled pipe. There are provided in the lower region of the calcining zone 2 at least one fuel supply location 6 and means 7 for supplying combustion air, for example, tertiary air, to the cooling zone 4. At least one raw meal line 8 of the preheating zone 1 further opens in the calcining zone 2. Fuel, combustion air and raw meal can be introduced into the calcining zone at one or more locations arranged one above the other. In that manner, different combustion zones can be constructed in the calcining zone.

The plant further comprises suitable means in order to be able to carry out at least some of the operating parameter measurements set out below:
a. gas analysis in the inlet region of the sintering zone, calcining zone and/or before the beginning of the preheating zone, it being possible to adjust the adsorption conditions by means of the composition of the gas atmosphere: more oxygen means more adsorption and therefore a higher SO$_3$ content in the precalcined material and less SO$_2$ in the exhaust chimney,
b. temperature measurement of material and/or gas in the sintering zone, it being possible to change the conditions for the sulphur evaporation in the sintering zone by means of the temperatures of the sintering zone and therefore to influence the circuits and accordingly the SO$_3$ concentrations in the clinker and in the precalcined material,
c. temperature measurement of material and/or gas in the calcining zone in order to ensure that an adequate temperature for calcining or for adsorption is ensured,
d. temperature measurement of material and/or gas in the preheating zone in order to support the general control of the plant,
e. laboratory analyses of the precalcined material, the raw material or the fuel,
f. laboratory analyses of the cement clinker burnt in the sintering zone,
g. thermal or thermographic analysis in the region of the sintering zone.

The cement plant is operated in such a manner that the precalcined material supplied to the sintering zone has an SO$_3$ concentration of at least 5.5% by mass and a CaSO$_4$ proportion of at least 75% by mass, preferably at least 90% of the total salt content. The SO$_3$ concentration and the CaSO$_4$ proportion in the precalcined material can be influenced by the following steps:
a. selecting the raw materials,
b. selecting the fuel used in the sintering zone,
c. adjusting the momentum of the burner 5 operated in the sintering zone,
d. adjusting the relationship of the combustion air and fuel in the sintering zone,
e. adjusting the relationship of the fuel amount and raw meal amount at least at one fuel supply location of the plant,
f. adjusting the precalcining degree of the raw meal after the calcining zone,
g. adjusting the raw meal fineness.

Even with predetermined raw materials and a predetermined fuel for the sintering zone, the SO$_3$ concentration and the CaSO$_4$ proportion can still be decisively influenced by the steps c to f. In particular the sulphur volatility in the sintering zone in the region of the sintering zone can thereby be influenced. In this instance, a sulphur volatility of at least 60%, preferably more than 80%, is desirable.

Another very important mechanism for operating the cement plant is the sulphur adsorption in the preheating zone 1, in the calcining zone 2 and/or in the inlet region of the sintering zone 3, it being possible to achieve an adsorption level of at least 80%, preferably at least 90%. The adsorption in the calcining zone is based on the following reaction:

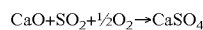

$$CaO + SO_2 + \tfrac{1}{2}O_2 \rightarrow CaSO_4$$

For this reaction, enough CaO and in particular O$_2$ must be provided in the calcining zone. For example, the oxygen reaches the calcining zone via the air inlet location 7. The combustion air is generally tertiary air from the cooling zone which could, however, be further enriched with pure oxygen.

The oxygen concentration in the calcining zone and the sulphur volatility are also influenced by means of the operating characteristics of the plant in the sintering zone and the adjustment of the relationship between the combustion air and the amount of fuel.

In such a cement plant, it is possible to use a fuel having a sulphur concentration of at least 3.5% by mass in the sintering zone and optionally in the calcining zone. If the plant is operated in such a manner that the precalcined material supplied to the sintering zone has an $SO_3$ concentration of at least 5.5% by mass and a $CaSO_4$ proportion of at least 75% by mass of the total salt content, it is possible for the operational safety of the plant to be ensured and deposits and blockages to be prevented in spite of the high charge of sulphur in the system and the low emissions of sulphur oxides (the exhaust gas discharged from the preheater has an $SO_2$ content of less than 600 mg/$Nm^3$ at % of $O_2$, preferably less than 300 mg/$Nm^3$ at 10% of $O_2$).

The cement clinker burnt in the sintering zone then has an $SO_3$ concentration of at least 1% by mass, preferably at least 2% by mass.

A device for interrupting the circuits, for example, a bypass device, can further be fitted and the circuits, in particular of sulphur, alkalis and/or chlorine, can be influenced and adjusted accordingly by the operation thereof and the changes to the separated amounts of dust and/or gas.

A plurality of air blast devices can also advantageously be fitted in specific regions of the preheater and/or calciner in order to improve the cleaning in the danger zones and to increase the operational safety.

The cement plant can be operated with the above-described method in an operationally safe manner with low $SO_2$ emissions.

The invention claimed is:

1. Method for operating a cement plant with preheating of raw meal in a preheating zone to form preheated material, precalcining of the preheated material in a calcining zone to form precalcined material and sintering of the precalcined material in a sintering zone to form cement clinker, the method characterised in that the precalcined material is supplied to the sintering zone having a total salt content that is at least 5.5% by mass SO3 and at least 75% by mass CaSO4, and further characterized by having a sulphur volatility in the sintering zone that is at least 60%.

2. Method according to claim 1, wherein fuel is employed in the sintering zone, the method characterised in that at least one of the following operating parameter measurements are carried out and used to control the cement plant:
   a. gas analysis in an inlet region of the sintering zone, the calcining zone or before the beginning of the preheating zone,
   b. temperature measurement of material or gas in the sintering zone,
   c. temperature measurement of material or gas in the calcining zone,
   d. temperature measurement of material or gas in the preheating zone,
   e. laboratory analyses of the precalcined material, the raw meal or the fuel,
   f. laboratory analyses of the cement clinker burnt in the sintering zone,
   g. thermal or thermographic analysis in the region of the sintering zone.

3. Method according to claim 1, characterised in that the SO3 concentration and the CaSO4 proportion in the precalcined material are influenced by at least one of the following steps:
   a. selecting the raw meal,
   b. selecting the fuel used in the sintering zone,
   c. adjusting the momentum of a burner operated in the sintering zone,
   d. adjusting the relationship of the combustion air and fuel in the sintering zone,
   e. adjusting the relationship of the fuel amount and raw meal amount at a fuel supply location of the plant,
   f. adjusting the precalcining degree of the raw meal after the calcining zone,
   g. adjusting the raw meal fineness.

4. Method according to claim 1, characterised in that a burner having adjustable momentum is used in the sintering zone and one of the shape, size and temperature of the flame is adjusted by adjusting the momentum.

5. Method according to claim 1, characterised in that the cement plant is operated in such a manner that the sulphur volatility in the sintering zone is at least 80%.

6. Method according to claim 1, characterised in that enough O2 and CaO are provided in the calcining zone for the following reaction:

$$CaO + SO2 + \tfrac{1}{2}O2 \rightarrow CaSO4.$$

7. Method according to claim 1, characterised in that the cement plant is operated in such a manner that the sulphur adsorption in one of the preheating zone, the calcining zone and the sintering zone is at least 80%.

8. Method according to claim 1, wherein the preheater produces exhaust gas and the method is further characterised in that the cement plant is operated in such a manner that the exhaust gas leaving the preheater has an SO2 content of less than 600 mg/Nm3 at 10% of O2.

9. Method according to claim 1, wherein the step of sintering produces oven exhaust gases and dust that are fed to the calcining zone and preheating zone, the exhaust gases having volatile components condensing on preheated material and raw meal therein, such that the condensed portion is fed again to the sintering zone creating a circuit formed by the volatilization and adsorption of components, the cement plant further including a bypass device for removing a portion of oven exhaust gases or dust and interrupting the circuit formed by the volatilization and adsorption of components, the components selected from the group consisting of alkalis, chlorine, sulphur and mixtures thereof, characterised in that the bypass device is operated and the circuit influenced and adjusted accordingly by the operation thereof and the changes to the separated amounts of dust or gas.

10. Method according to claim 9, characterised in that the cement plant includes multiple combustion locations and at least one of the combustion locations is operated with either combustion air enriched with oxygen or exclusively with oxygen in order to adjust the gas atmosphere and the CO2 concentration.

11. Method according to claim 1, characterised in that a fuel having a sulphur concentration of at least 3.5% by mass is used in one of the sintering and calcining zone.

12. Method according to claim 1, characterised in that the cement clinker burnt in the sintering zone has an SO3 concentration of at least 1% by mass.

* * * * *